US012736650B2

(12) United States Patent
Cross et al.

(10) Patent No.: US 12,736,650 B2
(45) Date of Patent: Sep. 15, 2026

(54) SYSTEM AND METHOD TO EXTRACT SATELLITE DOPPLER CURVES FROM WATERFALL SPECTROGRAMS DATA

(71) Applicant: Battelle Memorial Institute, Columbus, OH (US)

(72) Inventors: Rebekah Cross, Columbus, OH (US); Philip P. Cheney, Bexley, OH (US)

(73) Assignee: Battelle Memorial Institute, Columbus, OH (US)

( * ) Notice: Subject to any disclaimer, the term of this patent is extended or adjusted under 35 U.S.C. 154(b) by 529 days.

(21) Appl. No.: 18/069,384

(22) Filed: Dec. 21, 2022

(65) Prior Publication Data

US 2023/0194689 A1 Jun. 22, 2023

Related U.S. Application Data

(60) Provisional application No. 63/292,661, filed on Dec. 22, 2021.

(51) Int. Cl.
*G01S 11/10* (2006.01)

(52) U.S. Cl.
CPC .................................... *G01S 11/10* (2013.01)

(58) Field of Classification Search
CPC ............................... G01S 11/10; G01S 5/0246
See application file for complete search history.

(56) References Cited

U.S. PATENT DOCUMENTS 6,085,128 A 7/2000 Middour et al.
8,326,582 B2 * 12/2012 Mian ................. G01N 29/4463 702/56
9,576,373 B2 * 2/2017 Shorter ..................... G06T 7/12
(Continued)

FOREIGN PATENT DOCUMENTS

DE 112021005607 T5 * 8/2023 ............ B60W 10/06
DE 112021006299 T5 * 11/2023 ............. G06T 11/26
(Continued)

OTHER PUBLICATIONS

Richmond, David & Raichle, Katrina; "Doppler Curves in Satellite Tracking and Characterization"; Advanced Maui Optical and Space Surveillance Technologies Conference (AMOS); 2018; 11 pages.
(Continued)

*Primary Examiner* — Vladimir Magloire
*Assistant Examiner* — Kimberly Jenkins
(74) *Attorney, Agent, or Firm* — Secant IP, PLLC; Donald G. Weiss

(57) ABSTRACT

In an approach to extracting satellite Doppler curves from waterfall spectrograms, a system includes one or more computer processors; one or more non-transitory computer readable storage media; and program instructions stored on the one or more non-transitory computer readable storage media for execution by at least one of the one or more computer processors. The stored program instructions include instructions to receive satellite data; remove a first noise from the satellite data; agglomerate the satellite data into one or more clusters using adaptive clustering; fit a Doppler curve model to each cluster of the one or more clusters; remove noise clusters from the one or more clusters based on a second noise; and determine one or more orbital elements of a satellite for each remaining cluster of the one or more clusters.

20 Claims, 11 Drawing Sheets

(56) References Cited

U.S. PATENT DOCUMENTS

| | | | | |
|---|---|---|---|---|
| 2012/0046863 | A1* | 2/2012 | Hope | G01S 19/393 701/531 |
| 2016/0191163 | A1* | 6/2016 | Preston | G01L 1/242 398/16 |
| 2017/0016732 | A1* | 1/2017 | Ashton | G06F 16/322 |
| 2017/0272184 | A1* | 9/2017 | Zinevich | G01S 5/0246 |
| 2021/0123959 | A1* | 4/2021 | Prothero | H04B 17/318 |
| 2021/0302565 | A1* | 9/2021 | Jin | G01S 19/42 |
| 2022/0233119 | A1* | 7/2022 | Shelton, IV | A61B 5/165 |
| 2023/0174251 | A1* | 6/2023 | Sherman | B64G 3/00 701/509 |
| 2023/0305128 | A1* | 9/2023 | Rothe | G01S 11/10 |

FOREIGN PATENT DOCUMENTS

| | | | | |
|---|---|---|---|---|
| WO | WO-2020233152 | A1 * | 11/2020 | G06F 18/23213 |
| WO | WO-2022125173 | A2 * | 6/2022 | G01S 7/021 |

OTHER PUBLICATIONS

Satellite Tracking—Doppler Curves in Satellite Tracking; Zarya, Soviet, Russian and International Space Flight; Tyneside, UK; Oct. 15, 2021, Day 288; https://www.zarya.info/Tracking/Doppler.php; 7 pages.

* cited by examiner

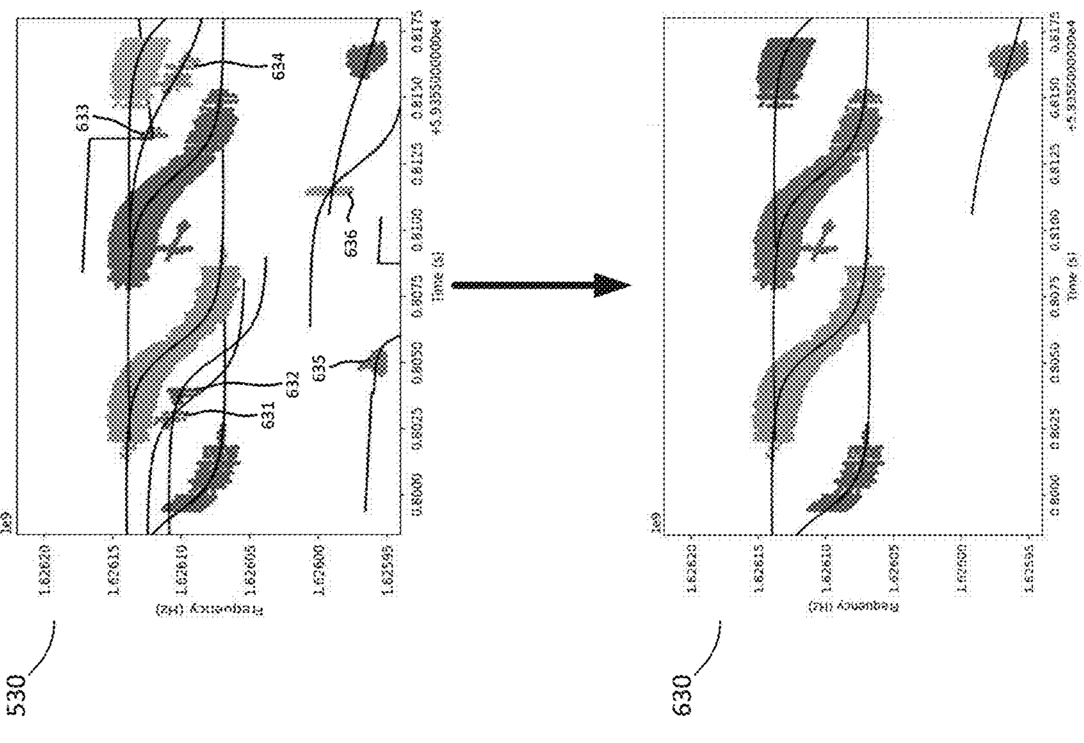
FIG. 6
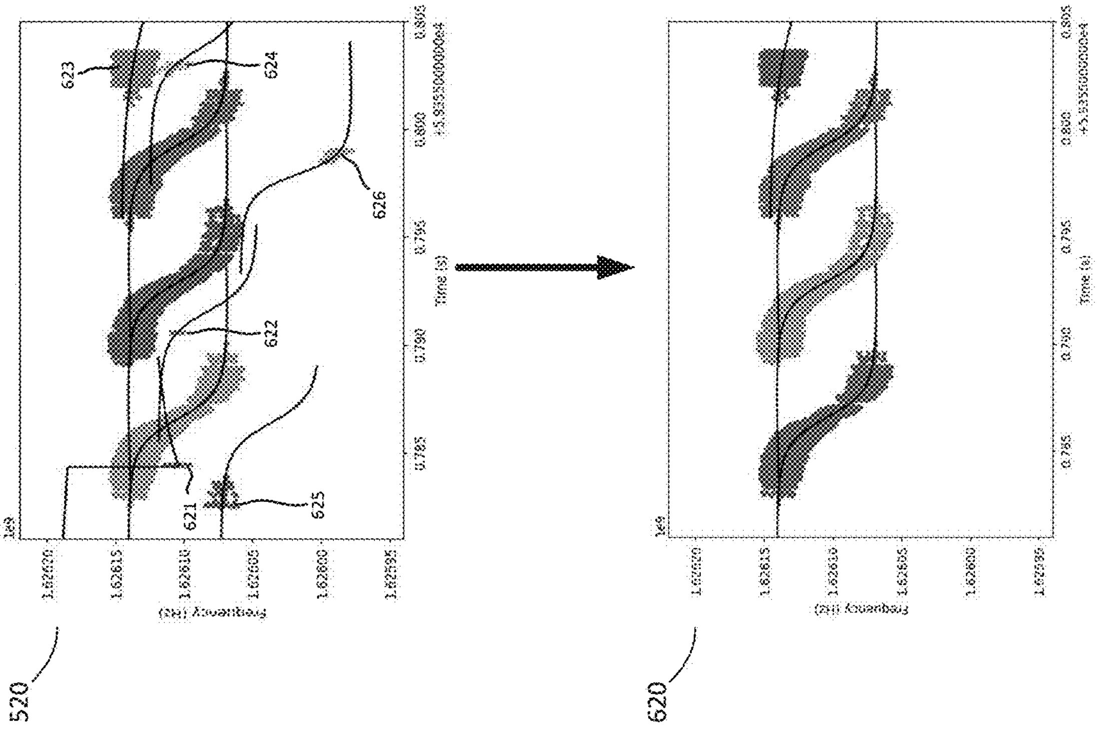

SYSTEM AND METHOD TO EXTRACT SATELLITE DOPPLER CURVES FROM WATERFALL SPECTROGRAMS DATA

CROSS-REFERENCE TO RELATED APPLICATIONS

The present application claims the benefit of the filing date of U.S. Provisional Application Ser. No. 63/292,661, filed Dec. 22, 2021, the entire teachings of which application is hereby incorporated herein by reference.

TECHNICAL FIELD

The present application relates generally to satellite tracking and, more particularly, to systems and methods to extract satellite Doppler curves from waterfall spectrograms.

BACKGROUND

One technique for satellite tracking utilizes the Doppler shift for determining the distance between a satellite and a receiver at the time of closest approach. In general, a signal may be transmitted by the satellite and received by a ground-based receiver, e.g., coupled to an antenna array. As a satellite approaches, the frequency of the transmitted signal appears raised relative to the actual transmission frequency. As the satellite recedes, the frequency appears to be lowered. At the time of closest approach, the transmitted and received frequencies are usually the same. A Doppler curve is produced by measuring the frequency against time.

As the satellite passes the receiver, the received frequency appears to fall but not in a constant manner. The rate of change starts off slow, is greatest at the time of closest approach and then tails off towards the end of the transit. This is because the received frequency is representative of the rate of change in the component of the satellite's velocity along a line joining the satellite to the receiver. The rate of change is greatest at the time of closest approach.

Clustering is a machine learning technique that involves the grouping of data points. Given a set of data points, a clustering algorithm classifies each data point into a specific group. Data points that are in the same group should have similar properties and/or features, while data points in different groups should have highly dissimilar properties and/or features.

BRIEF DESCRIPTION OF THE DRAWINGS

Reference should be made to the following detailed description which should be read in conjunction with the following figures, wherein like numerals represent like parts.

FIG. 6 is an example showing the cluster data with Doppler curves from FIG. 5 before and after removing noise clusters, in accordance with an embodiment of the present disclosure.

DETAILED DESCRIPTION

Figure 1:
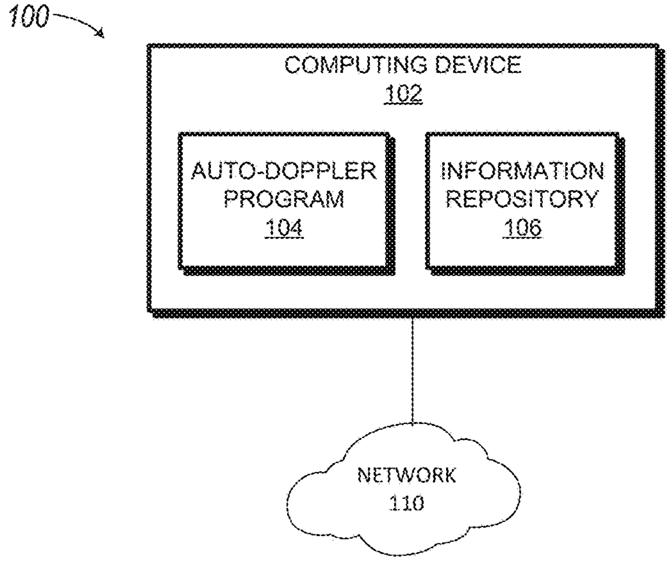
FIG. 1 is a functional block diagram illustrating a distributed data processing environment, in accordance with an embodiment of the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Satellite RF observation generates huge volumes of data which can contain many recognizable satellite signatures amid a noisy signal. Conventionally this is visualized with a waterfall spectrogram, where the X-axis is time and the Y-axis is frequency, and Doppler curves are identified manually by visual inspection. The current method for identifying distinct Doppler curves requires visual inspection by a human and manual classification of the data points associated with that curve. Automated identification of Doppler curves in waterfall spectrograms is challenging because of the noise present in received signals and heterogeneity in the density, extent and localization of Doppler curves picked up from passing satellites. The layered challenge of distinguishing signals of interest from noise, identifying Doppler curves from distinct orbiting emitters, and extracting orbital paths from those data currently requires manual intervention in each step. This is expensive and scales poorly. A system and method consistent with the present disclosure automates some or all of these steps, and, in some embodiments, removes the requirement for human intervention. Importantly, the present disclosure can be applied to large volumes of incoming data and has the ability to identify and extract orbital information from unknown emitters.

Building off of the capabilities of open-source optimizer software, such as the Radio Frequency Satellite Tracking (STRF) package available on GITHUB®, the present disclosure is a process to extract satellite Doppler curves from waterfall spectrograms. In some embodiments, a system and method disclosed herein consists of denoising the signal, clustering the remaining data into classes corresponding to individual Doppler curves, fitting orbits to the individual Doppler curves, removing clusters that represent noise, and generating orbital elements from the individual Doppler curves that can predict future orbital behavior such as time of next pass. Orbital elements may be any information or data that represent the position, velocity, or trajectory of the satellite. Examples of orbital elements may include, but are not limited to, eccentricity, semi-major axis, inclination, longitude of the ascending node, argument of periapsis, and true anomaly.

A first operation in the automated extraction of orbital elements from spectrograms may be to denoise the input satellite data obtained from the waterfall spectrograms. The satellite data is extracted from the waterfall spectrograms by selecting all points, i.e., time-frequency pairs, which rise above the background level. The dominant form that noise takes in these signals may be that of horizontal and vertical lines. These are distinct from Doppler curves which rarely exhibit slopes that are either zero or divergent. To remove these lines, the system may bin the data points by frequency and remove all points whose frequency has population above a predetermined threshold.

Unsupervised adaptive clustering with a variable merging threshold may then be used to sort the data into distinct Doppler curves. There are two modes of unsupervised adaptive clustering supported by the present disclosure, global mode, and local mode. In an embodiment, the mode may be chosen by a user. If the user has selected global mode, then the system may initialize a conservative threshold neighbor distance based on the range of nearest-neighbor separations over the whole data set and then reassess the threshold distance for each individual cluster when evaluating whether to merge a pair of clusters. If the user has selected local mode, then the system may iterate over pairs of clusters, and if a pair of clusters has two elements which satisfy both neighbor thresholds then the two clusters are merged. This may repeat until no additional merges occur. The adaptive clustering algorithm is explained in FIG. 9 below.

The next operation may be automated Doppler curve fitting. Rather than optimize all orbital elements simultaneously, the system may use open-source optimization software to fit functions to the Doppler curve data one orbital element at a time. In some embodiments, the orbital elements are output as a standard two-line element (TLE), a data format encoding a list of orbital elements of an Earth-orbiting object for a given point in time, known as the epoch. A two-line element set consists of two 69-character lines of data which can be used together with orbital models to determine the position and velocity of the associated satellite.

The next operation may be to remove any clusters that consist mainly of noise. Clusters with a low Root Mean Square Error (RMSE) between the cluster and its fitted Doppler curve model, and clusters that are sufficiently small, may be determined to consist of noise and removed.

FIG. 1 is a functional block diagram illustrating a distributed data processing environment, generally designated 100, suitable for operation of auto-Doppler program 104 in accordance with at least one embodiment of the present disclosure. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the disclosure as recited by the claims.

Distributed data processing environment 100 includes computing device 102 optionally connected to network 110. Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications between computing device 102 and other computing devices (not shown) within distributed data processing environment 100.

Computing device 102 can be a standalone computing device, a management server, a web server, a mobile computing device, or any other electronic device or computing system capable of receiving, sending, and processing data. In an embodiment, computing device 102 can be a laptop computer, a tablet computer, a netbook computer, a personal computer (PC), a desktop computer, a smart phone, or any programmable electronic device capable of communicating with other computing devices (not shown) within distributed data processing environment 100 via network 110. In another embodiment, computing device 102 can represent a server computing system utilizing multiple computers as a server system, such as in a cloud computing environment. In yet another embodiment, computing device 102 represents a computing system utilizing clustered computers and components (e.g., database server computers, application server computers) that act as a single pool of seamless resources when accessed within distributed data processing environment 100.

In an embodiment, computing device 102 includes auto-Doppler program 104. In an embodiment, auto-Doppler program 104 is a program, application, or subprogram of a larger program to extract satellite Doppler curves from waterfall spectrograms. In an alternative embodiment, auto-Doppler program 104 may be located on any other device accessible by computing device 102 via network 110.

In an embodiment, computing device 102 includes information repository 106. In an embodiment, information repository 106 may be managed by auto-Doppler program 104. In an alternate embodiment, information repository 106 may be managed by the operating system of the computing device 102, alone, or together with, auto-Doppler program 104. Information repository 106 is a data repository that can store, gather, compare, and/or combine information. In some embodiments, information repository 106 is located externally to computing device 102 and accessed through a communication network, such as network 110. In some embodiments, information repository 106 is stored on computing device 102. In some embodiments, information repository 106 may reside on another computing device (not shown), provided that information repository 106 is accessible by computing device 102. Information repository 106 includes, but is not limited to, satellite data, spectrogram data, RF data, orbital path data, orbital element data, waterfall data, and other data that is received by auto-Doppler program 104 from one or more sources, and data that is created by auto-Doppler program 104.

Information repository 106 may be implemented using any volatile or non-volatile non-transitory computer readable storage media for storing information, as known in the art. For example, information repository 106 may be implemented with random-access memory (RAM), solid-state drives (SSD), one or more independent hard disk drives, multiple hard disk drives in a redundant array of independent disks (RAID), optical library, or a tape library. Similarly, information repository 106 may be implemented with any suitable storage architecture known in the art, such as a relational database, an object-oriented database, or one or more tables.

Figure 2:
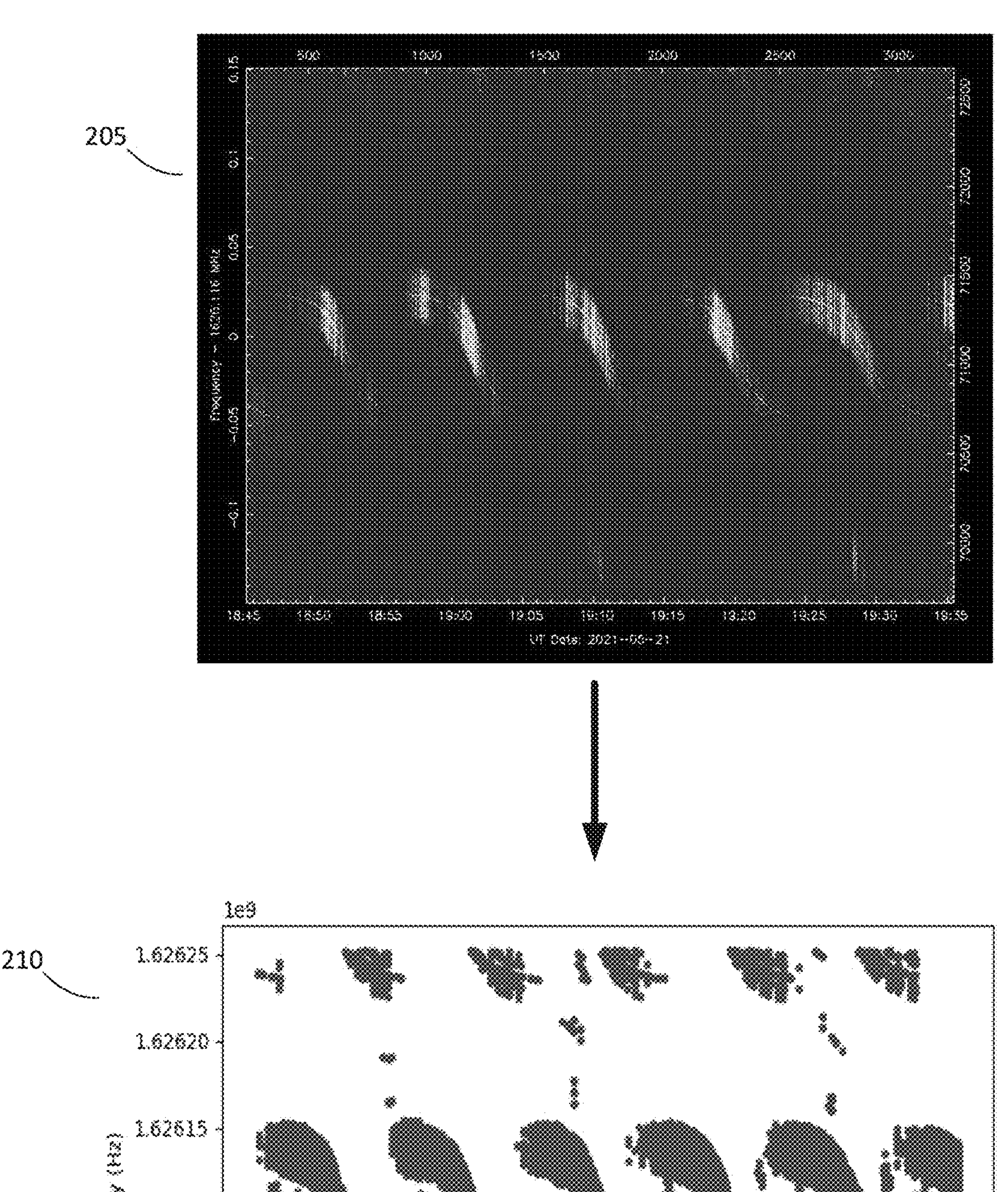
FIG. 2 is an example of extracting the data points from the waterfall data that exceed the background noise, in accordance with an embodiment of the present disclosure.

FIG. 2 is an example of extracting the data points from the waterfall data that exceed the background noise level, in accordance with an embodiment of the present disclosure. In FIG. 2, spectrum waterfall display 205 is an example of raw data received by auto-Doppler program 104. Filtered data 210 is an example of the data after removing the background noise, as explained, for example, in operations 802-806 in FIG. 8 below.

Figure 3:
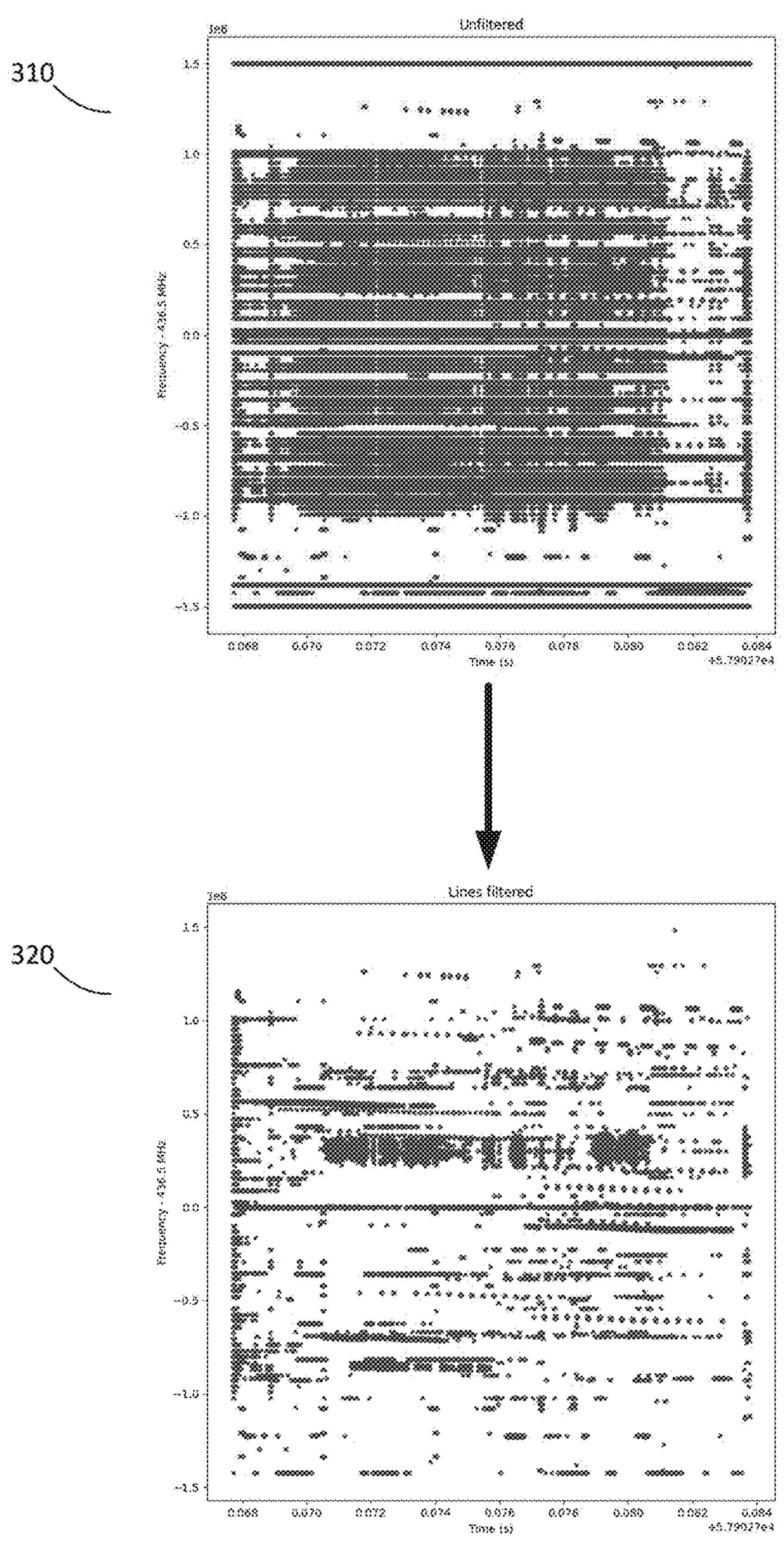
FIG. 3 is an example showing the extracted data from FIG. 2 before and after removing noise, in accordance with an embodiment of the present disclosure.

FIG. 3 is an example showing the extracted data from FIG. 2 before and after removing noise, in accordance with an embodiment of the present disclosure. In FIG. 3, raw data 310 illustrates an example waterfall display with constant frequency noise displayed as horizontal lines. In filtered data 320, auto-Doppler program 104 has filtered the lines of constant frequency since constant frequency data contains no Doppler shift. In some embodiments, auto-Doppler program 104 filters the lines of constant frequency by frequency binning the data points. Auto-Doppler program 104 may then use standard deviation to determine the line population of the frequency bins, removing the bins where the data points are within a predetermined range, e.g., a predetermined sigma threshold.

Figure 4:
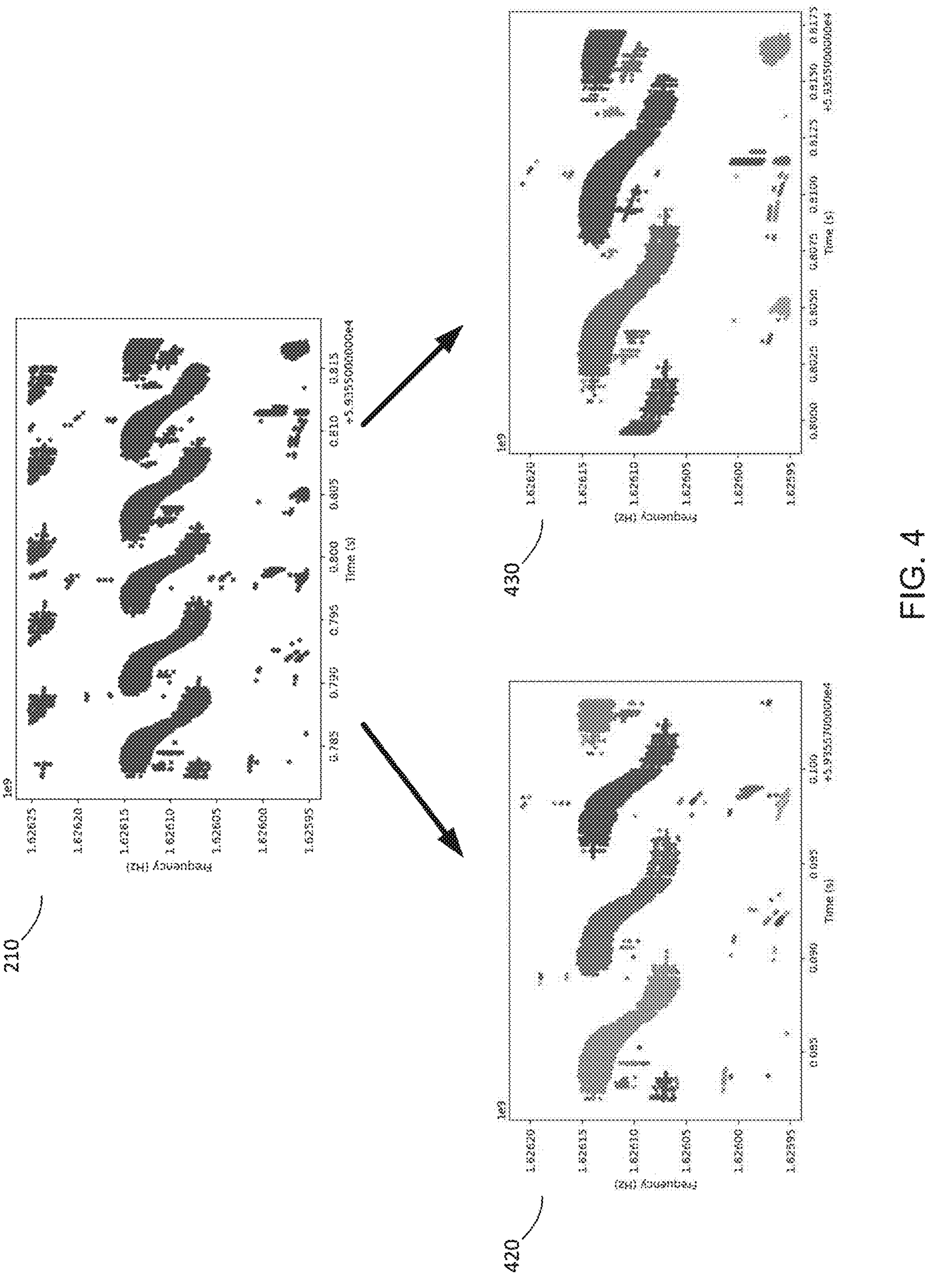
FIG. 4 is an example showing the data from FIG. 3 before and after data clustering, in accordance with an embodiment of the present disclosure.
Figure 5:
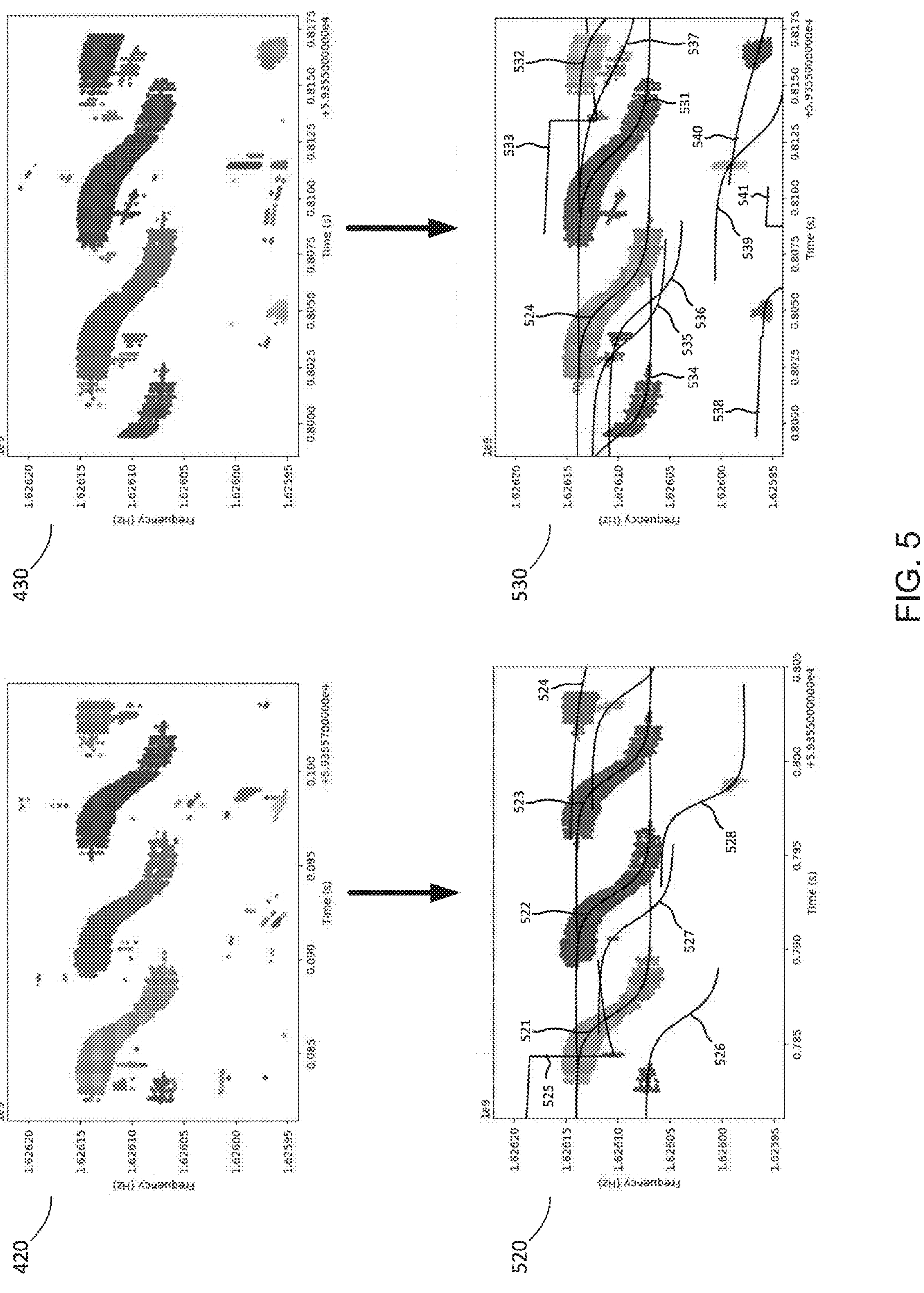
FIG. 5 is an example showing the cluster data from FIG. 4 before and after Doppler curve fitting, in accordance with an embodiment of the present disclosure.
Figure 7:
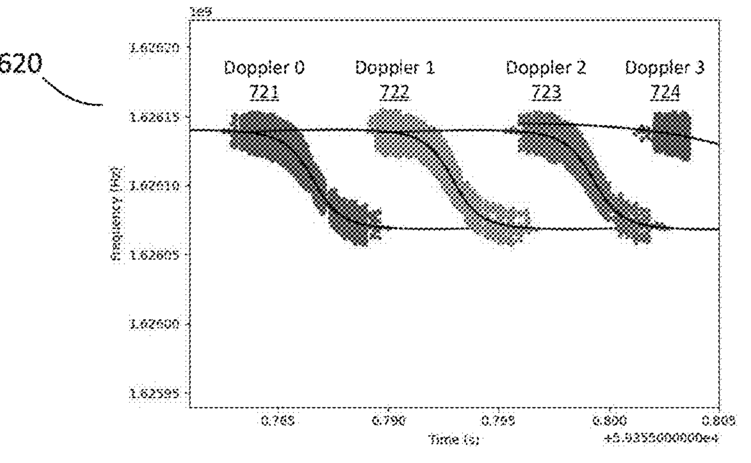
FIG. 7 is an example showing the cluster data with Doppler curves from FIG. 6 and the orbital elements extracted from each Doppler curve, in accordance with an embodiment of the present disclosure.
Figure 7:
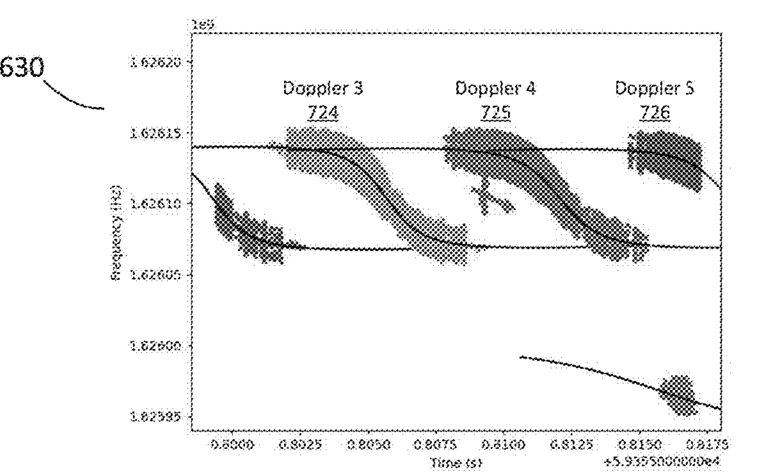
Figure 7:
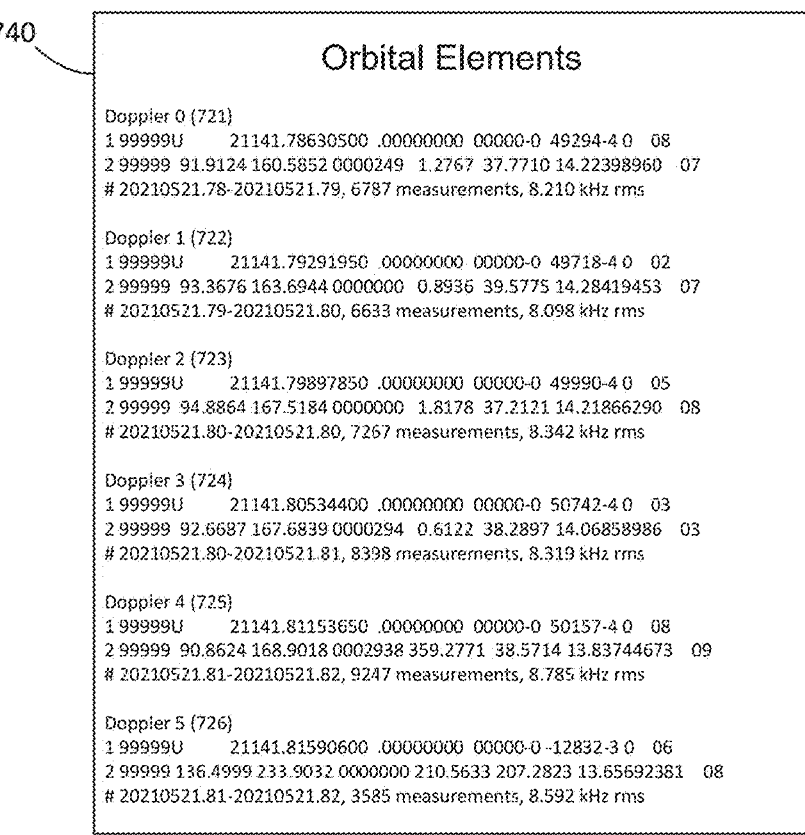
Figure 7:

FIG. 4 is an example showing the data from FIG. 3 before and after data clustering, in accordance with an embodiment of the present disclosure. In FIG. 4, filtered data 210 is the data prior to clustering. Tile 1 420 and tile 2 430 are examples of the data after clustering. It should be noted that the colors used in tile 1 420 and tile 2 430, as well as in FIGS. 5-7, are intended to illustrate data that is assigned to individual clusters, where all the points in any one cluster are the same color, but more than one cluster may be illustrated in any particular color. No other meaning should be associated with the individual colors, and no relationship is implied between clusters illustrated in the same color in these examples. An example of a data clustering process is described in operation 810 of FIG. 8, the flow diagram of FIG. 9 and the block diagram of FIG. 10 below.

FIG. 5 is an example showing the cluster data from FIG. 4 before and after Doppler curve fitting, in accordance with an embodiment of the present disclosure. In FIG. 5, tile 1 420 and tile 2 430 from FIG. 4 are analyzed by auto-Doppler program 104 to fit Doppler curves to the clusters. Doppler tile 1 520 and Doppler tile 2 530 are the results after curve fitting of tile 1 420 and tile 2 430, respectively. In Doppler tile 1 520, Doppler curve 521, Doppler curve 522, Doppler curve 523, Doppler curve 524, Doppler curve 525, Doppler curve 526, Doppler curve 527, and Doppler curve 528 have been identified. In Doppler tile 2 530, Doppler curve 524, which is the same Doppler curve as in Doppler tile 1 520, has been identified. In addition, Doppler curve 531, Doppler curve 532, Doppler curve 533, Doppler curve 534, Doppler curve 535, Doppler curve 536, Doppler curve 537, Doppler curve 538, Doppler curve 539, Doppler curve 540, and Doppler curve 541 have been identified. An example of a curve fitting process is described in operation 812 of FIG. 8 below.

FIG. 6 is an example showing the cluster data with Doppler curves from FIG. 5 before and after removing noise clusters, in accordance with an embodiment of the present disclosure. In FIG. 6, Doppler tile 1 520 and Doppler tile 2 530 from FIG. 5 are analyzed by auto-Doppler program 104 to remove clusters that contain only noise. Doppler tile 1 520 includes noise cluster 621, noise cluster 622, noise cluster 623, noise cluster 624, noise cluster 625, and noise cluster 626. Doppler tile 2 530 includes noise cluster 631, noise cluster 632, noise cluster 633, noise cluster 634, noise cluster 635, and noise cluster 636. Denoised Doppler tile 1 620 and denoised Doppler tile 2 630 are the results after removing the noise clusters of Doppler tile 1 520 and Doppler tile 2 530, respectively. An example of a noise removal process is described in operation 814 of FIG. 8 below.

FIG. 7 is an example showing the cluster data with Doppler curves from FIG. 6 and the orbital elements extracted from each Doppler curve, in accordance with an embodiment of the present disclosure. In FIG. 7, Denoised Doppler tile 1 620 and denoised Doppler tile 2 630 from FIG. 6 each have Doppler curves fit to them by auto-Doppler program 104. Denoised Doppler tile 1 620 contains Doppler 0 721, Doppler 1 722, Doppler 2 723, and part of Doppler 3 724. Denoised Doppler tile 2 630 contains Doppler 3 724, i.e., the full cluster that is partially shown in denoised Doppler tile 1 620, Doppler 4 725, and Doppler 5 726. Orbital elements chart 740 shows an example of the orbital elements extracted by auto-Doppler program 104 from Doppler 0 721, Doppler 2 723, Doppler 3 724, Doppler 4 725, and Doppler 5 726, respectively. In the example of orbital elements chart 740 the orbital elements for each cluster are displayed in TLE format.

Figure 8:
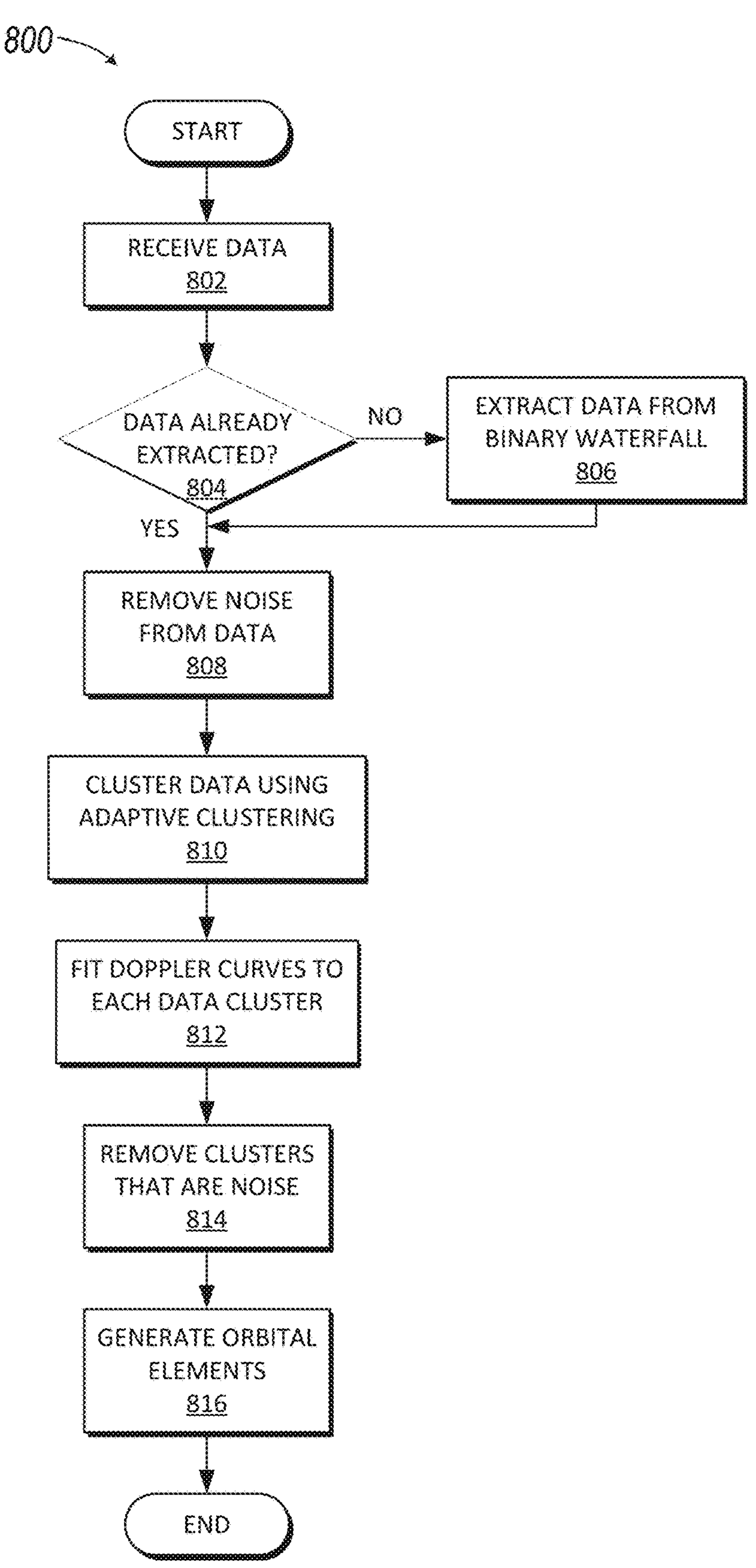
FIG. 8 is a flowchart diagram depicting operations for the auto-Doppler program to extract satellite Doppler curves from waterfall spectrograms, on the distributed data processing environment of FIG. 1, in accordance with an embodiment of the present disclosure.

FIG. 8 is a flow chart diagram of workflow 800 depicting operations for auto-Doppler program 104 to extract satellite Doppler curves from waterfall spectrograms, on the distributed data processing environment of FIG. 1, in accordance with an embodiment of the present disclosure. In an alternative embodiment, the operations of workflow 800 may be performed by any other program while working with auto-Doppler program 104.

It should be appreciated that embodiments of the present disclosure provide at least to extract satellite Doppler curves from waterfall spectrograms. However, FIG. 8 provides only an illustration of one implementation and does not imply any limitations with regard to the environments in which different embodiments may be implemented. Many modifications to the depicted environment may be made by those skilled in the art without departing from the scope of the disclosure as recited by the claims.

Auto-Doppler program 104 receives data (operation 802). In the illustrated example embodiment, auto-Doppler program 104 receives satellite data in the form of binary waterfall data as the input. The received data contains data points that represent X-Y pairs, where X is time and Y is frequency, which exceed any background noise. In another embodiment, auto-Doppler program 104 extracts the data points that exceed the background noise from the binary waterfall.

Auto-Doppler program 104 determines if the data was already extracted from the binary waterfall (decision block 804). Auto-Doppler program 104 determines if the received data has already been extracted from the background noise. If auto-Doppler program 104 determines that the received data has already been extracted from the background noise ("yes" branch, decision block 804), then auto-Doppler program 104 proceeds to operation 808. If auto-Doppler program 104 determines that the received data has not been extracted from the background noise ("no" branch, decision block 804), then auto-Doppler program 104 proceeds to operation 806 to extract the data.

Auto-Doppler program 104 extracts the data from the binary waterfall (operation 806). Auto-Doppler program 104 extracts the data by selecting all data points that exceed the background noise level. In some embodiments, auto-Doppler program 104 extracts the data from the binary waterfall using open-source optimizer software. In some embodiments, the open-source optimizer software is the STRF package.

Auto-Doppler program 104 removes noise from the data (operation 808). Auto-Doppler program 104 removes noise that consists of lines and small clusters. On the binary waterfall, horizontal lines represent signals having a constant frequency, and therefore these lines contain no Doppler data. Auto-Doppler program 104 removes the horizontal lines by determining a frequency bin for each data point in the satellite data. Once each data point has been assigned to a frequency bin, auto-Doppler program 104 determines a frequency population for each frequency bin. In some embodiments, auto-Doppler program 104 determines the frequency population using a standard deviation threshold, i.e., by determining if the frequency population is within a predetermined sigma threshold. In some embodiments, auto-Doppler program 104 determines the frequency population using the Jenks natural breaks algorithm.

Auto-Doppler program 104 removes all points from the satellite data that are assigned to frequency bins whose frequency has a population above a predetermined threshold. These horizontal lines that show up in the data tend to extend across much of the timespan of the observation and will therefore contain many data points (i.e., their frequencies will have high populations), whereas the data associated with Doppler-affected signals tends to have ranges of frequencies with relatively low populations. This is because a signal from a passing satellite is only picked up for the short time it takes for the satellite to pass in and out of view or range. The long horizontal strips (frequencies with high populations) may originate from stationary transmitters on Earth or some other unknown source, possibly due to the receiving equipment used to collect data, but do not typically represent Doppler signals from the passing satellite. Therefore, if the frequency has a population that is above the predetermined threshold, auto-Doppler program 104 removes these data points.

Auto-Doppler program 104 also removes small clusters of extraneous data from the satellite data. To identify small clusters, auto-Doppler program 104 may calculate the size, i.e., how many data are in each cluster, of all the clusters, and take the standard deviation of these cluster sizes. Auto-Doppler program 104 then uses a size parameter that is tuned by the user to remove all clusters with a size less than the size parameter multiplied by the standard deviation.

To actually remove the clusters, each data point in the full, unfiltered, unclustered data set is identified by an index (e.g., an integer). The adaptive clustering algorithm of auto-Doppler program 104 creates a cluster list where each element of the list (i.e., each cluster) is a list of integer indices. These indices are preserved even if there are subtractions from the data set. For example, if the cluster is described as [1,4,10], this indicates the cluster contains the first, fourth and tenth data points in the original data set. To remove a cluster of data from the set, auto-Doppler program 104 deletes the data at the given indices. In this example, auto-Doppler program 104 deletes the first, fourth and tenth data points. The indices of the remaining data are unaffected by the deletions.

Auto-Doppler program 104 clusters the data using adaptive clustering (operation 810). Auto-Doppler program 104 begins by assigning each data point to an initial cluster which contains only the single data point. Auto-Doppler program 104 agglomerates the clusters by merging clusters together to form larger clusters. Auto-Doppler program 104 merges cluster based on the distance between the data points in the clusters. The details of an example procedure used by auto-Doppler program 104 for adaptive clustering is explained in the flow diagram of FIG. 9 and illustrated in the block diagram of FIG. 10 below. In some embodiments, machine learning may be used for adaptive clustering.

Auto-Doppler program 104 fits Doppler curves to each data cluster (operation 812). Auto-Doppler program 104 fits Doppler curves to each cluster created in operation 810 using open-source software, e.g., STRF or SGDP4. In some embodiments, rather than optimize all orbital elements simultaneously, auto-Doppler program 104 uses the open-source module that fits functions to Doppler curve data one orbital element at a time.

Auto-Doppler program 104 removes clusters that are noise (operation 814). Auto-Doppler program 104 calculates the RMSE for each cluster. In an embodiment, if auto-Doppler program 104 determines that any cluster has an RMSE below a predetermined threshold, then auto-Doppler program 104 removes that cluster. In another embodiment, auto-Doppler program 104 calculates the size of each cluster. If auto-Doppler program 104 determines that the size of any cluster is below a predetermined threshold, then auto-Doppler program 104 removes that cluster. In some embodiments, the predetermined thresholds are chosen by the user.

Auto-Doppler program 104 generates orbital elements (operation 816). Auto-Doppler program 104 generates orbital elements from the remaining clusters. In some embodiments, auto-Doppler program 104 uses open-source software, e.g., STRF, to generate the orbital elements from the remaining clusters. In some embodiments, auto-Doppler program 104 generates a standard TLE from the orbital elements. In some embodiments, the output from auto-Doppler program 104 includes the orbital elements, the cluster data, and model predictions.

Figure 9:
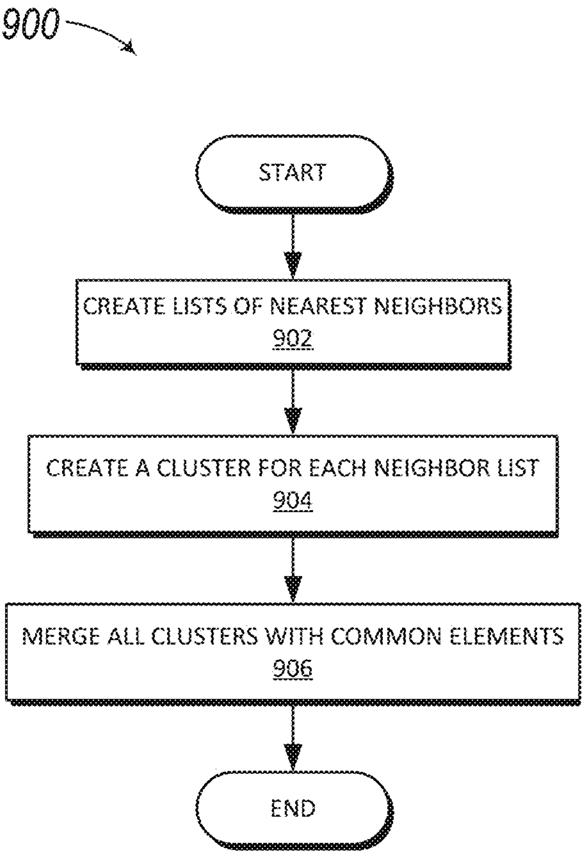
FIG. 9 is a flow chart diagram of workflow 900 depicting operations for the section of the auto-Doppler program that performs the adaptive clustering, on the distributed data processing environment of FIG. 1, in accordance with an embodiment of the present disclosure.
Figure 10:
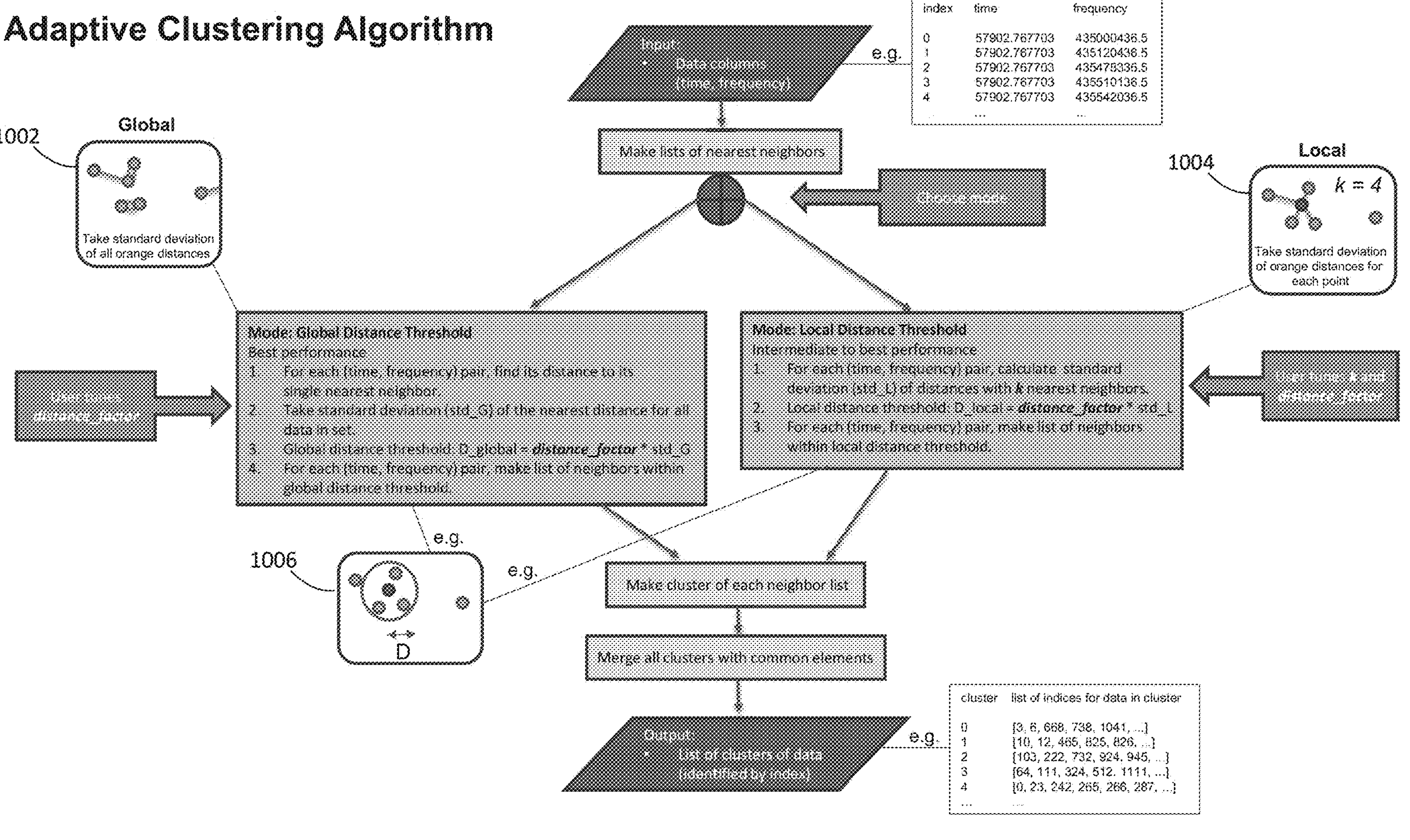
FIG. 10 is a block diagram depicting operations for the adaptive clustering algorithm, in accordance with an embodiment of the present disclosure.

FIG. 9 is a flow chart diagram of workflow 900 depicting operations for the section of auto-Doppler program 104 that performs the adaptive clustering, on the distributed data processing environment of FIG. 1, in accordance with an embodiment of the present disclosure. In an alternative embodiment, the operations of workflow 900 may be performed by any other program while working with auto-Doppler program 104.

It should be appreciated that embodiments of the present disclosure provide at least to extract satellite Doppler curves from waterfall spectrograms. However, FIG. 9 provides only an illustration of one implementation and does not imply any limitations with regard to the environments in which different embodiments may be implemented. Many modifications to the depicted environment may be made by those skilled in the art without departing from the scope of the disclosure as recited by the claims.

In the illustrated example 900, Auto-Doppler program 104 makes lists of nearest neighbors (operation 902). In the illustrated example embodiment, auto-Doppler program 104 creates a list of nearest neighbors for each data point (time, frequency pair) remaining in the satellite data after denoising in operations 806 and 808 of FIG. 8. A nearest neighbor to a data point is any other point within threshold distance D of the first point. The value of threshold distance D depends on the mode that is selected by the user. An example of nearest neighbors is illustrated as neighbors 1006 of FIG. 10.

To calculate the threshold distance D, auto-Doppler program 104 determines whether the global distance threshold mode or the local distance threshold mode is selected. In an embodiment, if auto-Doppler program 104 determines that the global distance threshold mode is selected, then auto-Doppler program 104 calculates the distance threshold D by looking at the entire data set. In this mode, the user sets the distance threshold in units of the standard deviation of the nearest neighbor separations.

In global distance threshold mode, auto-Doppler program 104 calculates the distance between each data point and the single nearest neighbor for the data point, i.e., for each time, frequency pair, remaining in the satellite data after the noise removal. In this mode, there is a single distance threshold used to identify the neighbors of each point in the data set. One example of this this set of separations between each point and its nearest neighbor is illustrated in global 1002 of FIG. 10. If two points are each other's nearest neighbor, then auto-Doppler program 104 counts the distance twice.

Once the nearest distance for each data point remaining in the satellite data has been calculated, auto-Doppler program 104 calculates the standard deviation of the distance to the single nearest neighbor for each data point remaining in the satellite data. Auto-Doppler program 104 calculates the distance threshold D by multiplying this standard deviation by a predetermined distance factor, i.e., $D_{global}$=(distance factor)*(standard deviation of nearest neighbor separations). The predetermined distance factor is a parameter that is tuned by the user.

In an embodiment, if auto-Doppler program 104 determines that the local distance threshold mode is selected, then auto-Doppler program 104 calculates a distance threshold D for each data point individually by looking at the distance between it and k of its closest neighbors, where k is chosen by the user. In local distance threshold mode, the user sets the distance threshold in units of the standard deviation of the distances between each point and its closest neighbors. To calculate that standard deviation, the user must specify how many nearby points (k) to use.

In local distance threshold mode, there is a different distance threshold used to identify the neighbors of each data point i in the data set. One example of this set of separations between each data point and its nearest neighbor is illustrated in local 1004 of FIG. 10. Auto-Doppler program 104 calculates the standard deviation of the distance to the k nearest neighbors for each data point, i.e., for each time, frequency pair, remaining in the satellite data after the noise removal. Auto-Doppler program 104 calculates the distance threshold D for each data point i by multiplying this standard deviation by a predetermined distance factor, i.e., $D_{local\_i}$=(distance factor)*(standard deviation of the distances between point i and its k nearest neighbors). The predetermined distance factor is a parameter that is tuned by the user.

In either global distance threshold mode or local distance threshold mode, for each remaining data point in the satellite data after noise removal, auto-Doppler program 104 creates a list of nearest neighbors that are within the distance threshold D of that data point. This creates a nearest neighbors list for each remaining data point in the satellite data.

Auto-Doppler program 104 creates a cluster for each neighbor list (operation 904). Auto-Doppler program 104 creates a cluster for each nearest neighbor list, i.e., for each remaining data point in the satellite data.

Auto-Doppler program 104 merges all clusters with common elements (operation 906). Auto-Doppler program 104 merges all the clusters created in operation 904 that share common elements. For example, if cluster 0 and cluster 3 both contain point 12, then auto-Doppler program 104 merges cluster 0 and cluster 3. This repeats until all the clusters with common elements have been merged. The adaptive clustering section of auto-Doppler program 104 then ends for this cycle, and auto-Doppler program 104 returns to operation 812 in FIG. 8.

Figure 11:
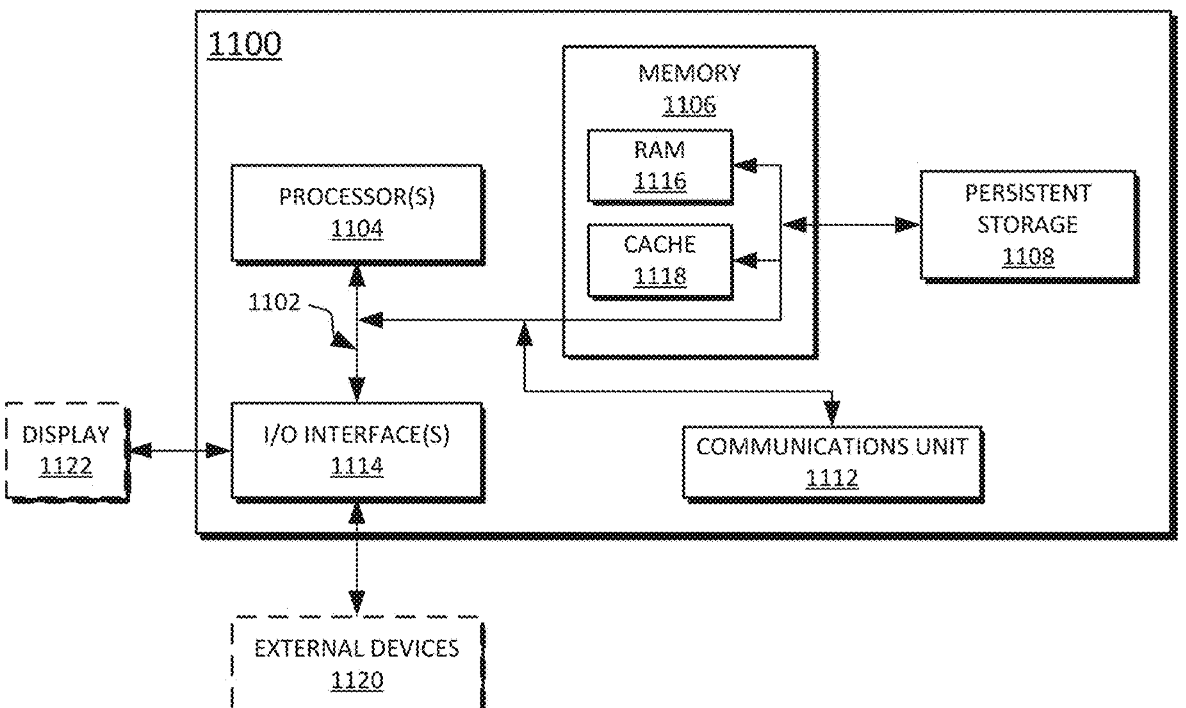
FIG. 11 depicts a block diagram of components of the computing device executing the automatic detection program within the distributed data processing environment of FIG. 1, in accordance with an embodiment of the present disclosure.

FIG. 11 is a block diagram depicting components of one example computing device 1100 of the computing device 102 suitable for auto-Doppler program 104, in accordance with at least one embodiment of the disclosure. FIG. 11 displays the computing device or computer 1100, one or more processor(s) 1104 (including one or more computer processors), a communications fabric 1102, a memory 1106 including, a random-access memory (RAM) 1116 and a cache 1118, a persistent storage 1108, a communications unit 1112, I/O interfaces 1114, a display 1122, and external devices 1120. It should be appreciated that FIG. 11 provides only an illustration of one embodiment and does not imply any limitations with regard to the environments in which different embodiments may be implemented. Many modifications to the depicted environment may be made.

As depicted, the computing device 1100 operates over the communications fabric 1102, which provides communications between the computer processor(s) 1104, memory 1106, persistent storage 1108, communications unit 1112, and input/output (I/O) interface(s) 1114. The communications fabric 1102 may be implemented with an architecture suitable for passing data or control information between the processors 1104 (e.g., microprocessors, communications processors, and network processors), the memory 1106, the external devices 1120, and any other hardware components within a system. For example, the communications fabric 1102 may be implemented with one or more buses.

The memory 1106 and persistent storage 1108 are computer readable storage media. In the depicted embodiment, the memory 1106 comprises a RAM 1116 and a cache 1118. In general, the memory 1106 can include any suitable volatile or non-volatile computer readable storage media. Cache 1118 is a fast memory that enhances the performance of processor(s) 1104 by holding recently accessed data, and near recently accessed data, from RAM 1116.

Program instructions for auto-Doppler program 104 may be stored in the persistent storage 1108, or more generally, any computer readable storage media, for execution by one or more of the respective computer processors 1104 via one or more memories of the memory 1106. The persistent storage 1108 may be a magnetic hard disk drive, a solid-state disk drive, a semiconductor storage device, flash memory, read only memory (ROM), electronically erasable programmable read-only memory (EEPROM), or any other computer readable storage media that is capable of storing program instruction or digital information.

The media used by persistent storage 1108 may also be removable. For example, a removable hard drive may be used for persistent storage 1108. Other examples include optical and magnetic disks, thumb drives, and smart cards that are inserted into a drive for transfer onto another computer readable storage medium that is also part of persistent storage 1108.

The communications unit 1112, in these examples, provides for communications with other data processing systems or devices. In these examples, the communications unit 1112 includes one or more network interface cards. The communications unit 1112 may provide communications through the use of either or both physical and wireless communications links. In the context of some embodiments of the present disclosure, the source of the various input data may be physically remote to the computing device 1100 such that the input data may be received, and the output similarly transmitted via the communications unit 1112.

The I/O interface(s) 1114 allows for input and output of data with other devices that may be connected to computing device 1100. For example, the I/O interface(s) 1114 may provide a connection to external device(s) 1120 such as a keyboard, a keypad, a touch screen, a microphone, a digital camera, and/or some other suitable input device. External device(s) 1120 can also include portable computer readable storage media such as, for example, thumb drives, portable optical or magnetic disks, and memory cards. Software and data used to practice embodiments of the present disclosure, e.g., auto-Doppler program 104, can be stored on such portable computer readable storage media and can be loaded onto persistent storage 1108 via the I/O interface(s) 1114. I/O interface(s) 1114 also connect to a display 1122.

Display 1122 provides a mechanism to display data to a user and may be, for example, a computer monitor. Display 1122 can also function as a touchscreen, such as a display of a tablet computer.

According to one aspect of the present disclosure, there is thus provided a system for automated satellite Doppler curve orbit fitting. The system includes: one or more computer processors; one or more non-transitory computer readable storage media; and program instructions stored on the one or more non-transitory computer readable storage media for execution by at least one of the one or more computer processors. The stored program instructions include instructions to receive satellite data; remove a first noise from the satellite data; agglomerate the satellite data into one or more clusters using adaptive clustering; fit a Doppler curve model to each cluster of the one or more clusters; remove noise clusters from the one or more clusters based on a second noise; and determine one or more orbital elements of a satellite for each remaining cluster of the one or more clusters.

According to another aspect of the disclosure, there is provided a computer-implemented method for automated satellite Doppler curve orbit fitting. The computer-implemented method includes receiving, by one or more computer processors, satellite data; removing, by the one or more computer processors, a first noise from the satellite data; agglomerating, by the one or more computer processors, the satellite data into one or more clusters using adaptive clustering; fitting, by the one or more computer processors, a Doppler curve model to each cluster of the one or more clusters; removing, by the one or more computer processors, noise clusters from the one or more clusters based on a second noise; and determining, by the one or more computer processors, one or more orbital elements of a satellite for each remaining cluster of the one or more clusters.

According to another aspect of the disclosure, there is provided a system for automated satellite Doppler curve orbit fitting, the system. The system includes one or more non-transitory computer readable storage media and one or more computer processors. The one or more computer processors are further configured to receive satellite data; remove a first noise from the satellite data; agglomerate the satellite data into one or more clusters using adaptive clustering; fit a Doppler curve model to each cluster of the one or more clusters; remove noise clusters from the one or more clusters based on a second noise; and determine one or more orbital elements of a satellite for each remaining cluster of the one or more clusters.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include a computer readable storage medium (or media) having computer readable program instructions thereon for causing a processor to carry out aspects of the present disclosure.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or other programmable logic devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system for automated satellite Doppler curve orbit fitting, the system comprising:
- one or more computer processors;
- one or more non-transitory computer readable storage media; and
- program instructions stored on the one or more non-transitory computer readable storage media for execution by at least one of the one or more computer processors, the stored program instructions including instructions to:
  - receive waterfall spectrograms;
  - extract satellite data from the waterfall spectrograms;
  - remove a first noise from the satellite data, wherein the first noise includes horizontal lines and small clusters;
  - agglomerate the satellite data into one or more clusters using adaptive clustering, wherein the adaptive clustering creates a cluster list wherein each element of the cluster list is a list of integer indices;
  - fit a Doppler curve model to each cluster of the one or more clusters;
  - remove noise clusters from the one or more clusters based on a second noise wherein the second noise has a Root Mean Square Error (RMSE) below a predetermined threshold; and
  - determine one or more orbital elements of a satellite for each remaining cluster of the one or more clusters.

2. The system of claim 1, wherein remove the first noise from the satellite data further comprises program instructions, stored on the one or more non-transitory computer readable storage media, to:
- determine a frequency bin of a plurality of frequency bins for each first data point of a plurality of data points in the satellite data based on a frequency of the first data point, wherein each frequency bin consists of a predetermined range of frequencies;

determine a frequency population for each frequency bin of the plurality of frequency bins; and responsive to any frequency bin of the plurality of frequency bins having the frequency population that is above a predetermined threshold, remove each first data point that is in the frequency bin from the satellite data.

3. The system of claim 2, wherein the predetermined range of frequencies are based on one or more standard deviation sigma thresholds.

4. The system of claim 2, wherein the predetermined range of frequencies are determined by a Jenks natural breaks algorithm.

5. The system of claim 1, wherein agglomerate the satellite data into the one or more clusters using adaptive clustering comprises program instructions, stored on the one or more non-transitory computer readable storage media, to:

create a list of nearest neighbors for each first data point of a plurality of data points in the satellite data, wherein the list of nearest neighbors contains any second data point of the plurality of data points in the satellite data that is within a distance threshold of the first data point;

create a cluster from the list of nearest neighbors for each first data point of the plurality of data points in the satellite data; and agglomerate a plurality of clusters by merging each cluster with any other cluster that shares one or more common elements.

6. The system of claim 5, wherein create the list of nearest neighbors for each first data point of the plurality of data points in the satellite data, wherein the list of nearest neighbors contains any second data point of the plurality of data points in the satellite data that is within the distance threshold of the first data point further comprises program instructions, stored on the one or more non-transitory computer readable storage media, to:

calculate a distance to a single nearest neighbor for each first data point of the plurality of data points in the satellite data;

calculate a standard deviation of the distance to the single nearest neighbor for every first data point of the plurality of data points in the satellite data; and calculate the distance threshold by multiplying the standard deviation by a predetermined distance factor.

7. The system of claim 5, wherein create the list of nearest neighbors for each first data point of the plurality of data points in the satellite data, wherein the list of nearest neighbors contains any second data point of the plurality of data points in the satellite data that is within the distance threshold of the first data point further comprises program instructions, stored on the one or more non-transitory computer readable storage media, to:

calculate a standard deviation of a distance to k nearest neighbors for every first data point of the plurality of data points in the satellite data, wherein k is chosen by a user; and calculate the distance threshold by multiplying the standard deviation by a predetermined distance factor.

8. The system of claim 1, wherein the one or more orbital elements of the satellite are determined using an optimizer.

9. The system of claim 1, further comprising program instructions, stored on the one or more computer readable storage media, to:

generate a two-line element from the one or more orbital elements of the satellite.

10. The system of claim 9, wherein the two-line element is generated from the one or more orbital elements of the satellite using an optimizer.

11. A computer-implemented method for automated satellite Doppler curve orbit fitting, the computer-implemented method comprising:

receiving, by one or more computer processors, waterfall spectrograms;

extracting, by one or more computer processors, satellite data from the waterfall spectrograms;

removing, by the one or more computer processors, a first noise from the satellite data, wherein the first noise includes horizontal lines and small clusters;

agglomerating, by the one or more computer processors, the satellite data into one or more clusters using adaptive clustering, wherein the adaptive clustering creates a cluster list wherein each element of the cluster list is a list of integer indices;

fitting, by the one or more computer processors, a Doppler curve model to each cluster of the one or more clusters;

removing, by the one or more computer processors, noise clusters from the one or more clusters based on a second noise, wherein the second noise has a Root Mean Square Error (RMSE) below a predetermined threshold; and determining, by the one or more computer processors, one or more orbital elements of a satellite for each remaining cluster of the one or more clusters.

12. The computer-implemented method of claim 11, wherein removing the noise clusters from the one or more clusters based on a second noise further comprises program instructions, stored on the one or more non-transitory computer readable storage media, to: calculating, by the one or more computer processors, the second noise for each cluster of the one or more clusters, wherein the second noise is a Root Mean Square Error (RMSE) between the cluster and the Doppler curve model for the cluster; and responsive to the cluster having the second noise below a predetermined threshold, removing, by the one or more computer processors, the cluster from the one or more clusters.

13. The computer-implemented method of claim 11, wherein removing the noise clusters from the one or more clusters based on a second noise further comprises program instructions, stored on the one or more non-transitory computer readable storage media, to:

calculating, by the one or more computer processors, the second noise for each cluster of the one or more clusters, wherein the second noise is a size of the cluster; and responsive to the cluster having the size below a predetermined threshold, removing, by the one or more computer processors, the cluster from the one or more clusters.

14. The computer-implemented method of claim 11, further comprising program instructions, stored on the one or more non-transitory computer readable storage media, to:

generating, by the one or more computer processors, a two-line element from the one or more orbital elements of the satellite.

15. A system for automated satellite Doppler curve orbit fitting, the system comprising:

one or more non-transitory computer readable storage media; and one or more computer processors, the one or more computer processors are further configured to:

receive waterfall spectrograms;

extract satellite data from the waterfall spectrograms;

remove a first noise from the satellite data, wherein the first noise includes horizontal lines and small clusters;

agglomerate the satellite data into one or more clusters using adaptive clustering, wherein the adaptive clustering creates a cluster list wherein each element of the cluster list is a list of integer indices;

fit a Doppler curve model to each cluster of the one or more clusters;

remove noise clusters from the one or more clusters based on a second noise wherein the second noise has a Root Mean Square Error (RMSE) below a predetermined threshold; and determine one or more orbital elements of a satellite for each remaining cluster of the one or more clusters.

16. The system of claim 15, wherein remove the first noise from the satellite data further comprises:

determine a frequency bin of a plurality of frequency bins for each first data point of a plurality of data points in the satellite data based on a frequency of the first data point, wherein each frequency bin consists of a predetermined range of frequencies;

determine a frequency population for each frequency bin of the plurality of frequency bins; and responsive to any frequency bin of the plurality of frequency bins having the frequency population that is above a predetermined threshold, remove each first data point that is in the frequency bin from the satellite data.

17. The system of claim 16, wherein the predetermined range of frequencies are based on one or more standard deviation sigma thresholds.

18. The system of claim 16, wherein the predetermined range of frequencies are determined by a Jenks natural breaks algorithm.

19. The system of claim 15, wherein agglomerate the satellite data into the one or more clusters using adaptive clustering comprises:

create a list of nearest neighbors for each first data point of a plurality of data points in the satellite data, wherein the list of nearest neighbors contains any second data point of the plurality of data points in the satellite data that is within a distance threshold of the first data point;

create a cluster from the list of nearest neighbors for each first data point of the plurality of data points in the satellite data; and agglomerate a plurality of clusters by merging each cluster with any other cluster that shares one or more common elements.

20. The system of claim 19, wherein create the list of nearest neighbors for each first data point of the plurality of data points in the satellite data, wherein the list of nearest neighbors contains any second data point of the plurality of data points in the satellite data that is within the distance threshold of the first data point further comprises:

calculate a distance to a single nearest neighbor for each first data point of the plurality of data points in the satellite data;

calculate a standard deviation of the distance to the single nearest neighbor for every first data point of the plurality of data points in the satellite data; and calculate the distance threshold by multiplying the standard deviation by a predetermined distance factor.

* * * * *